Feb. 15, 1944.    R. H. DEAN    2,341,908
DOOR HANDLE ASSEMBLY
Filed Nov. 24, 1941
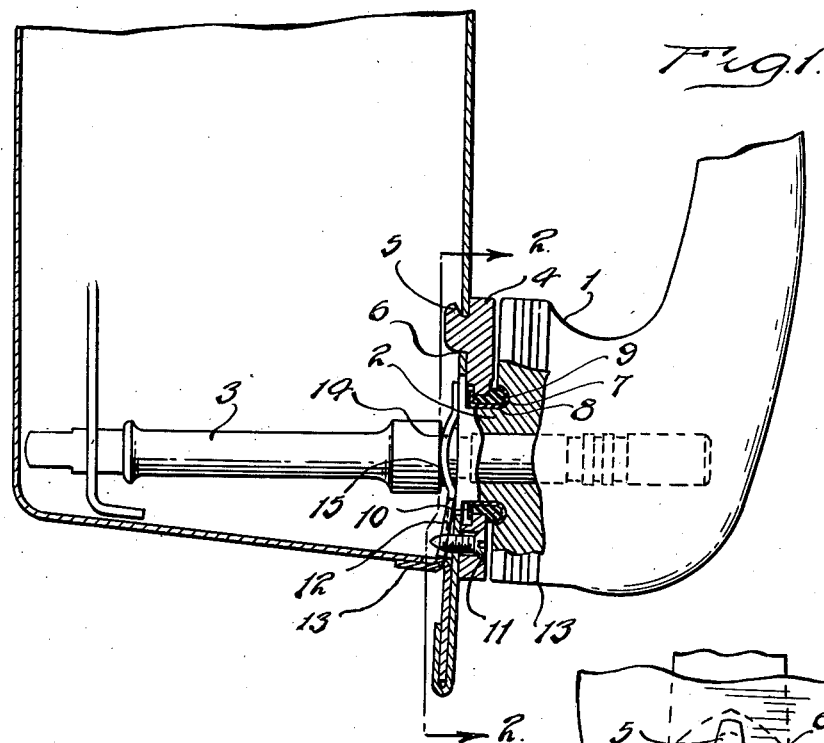
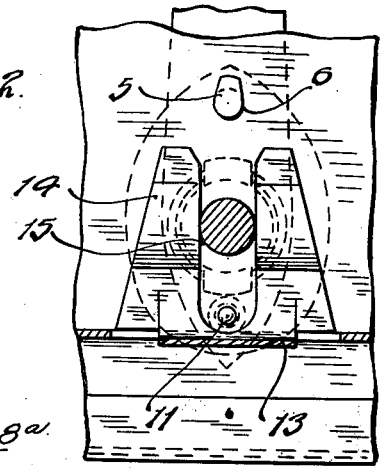
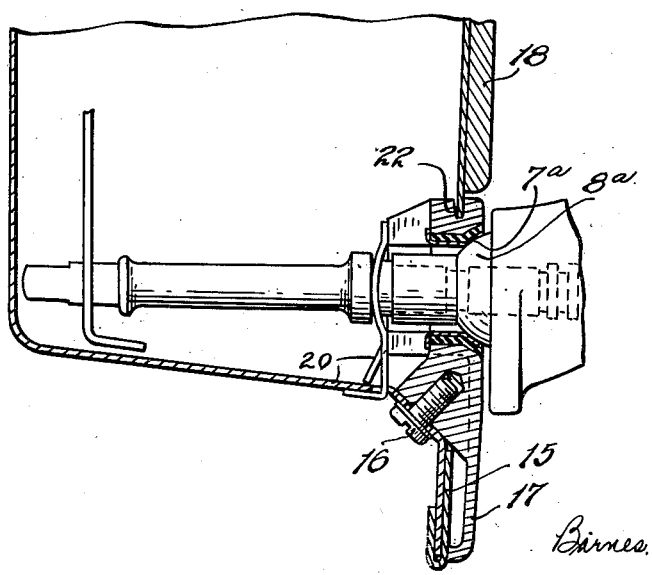
INVENTOR.
ROY H. DEAN.
BY
Barnes, Kisselle, Laughlin & Raisch
ATTORNEYS.

Patented Feb. 15, 1944

2,341,908

UNITED STATES PATENT OFFICE 2,341,908

DOOR HANDLE ASSEMBLY

Roy H. Dean, Detroit, Mich., assignor to Ternstedt Manufacturing Company, Detroit, Mich., a corporation of Michigan Application November 24, 1941, Serial No. 420,184

1 Claim. (Cl. 292—352)

This invention relates to a handle assembly and has for its object a simple, effective handle assembly for an automobile door.

In the prior art various ways have been suggested for mounting the door handle in a sheet metal door panel, including escutcheons, bushings, etc., yieldable and non-yieldable. One of the problems that has been present in all automobile door handle assemblies has been the misalignment of the handle bearing with the opening into which the door handle spindle fits, to wit: the opening in the lock roll-back. This has resulted in the proposal of flexible or yieldable or ball-and-socket seatings for the handle in the outside panel of the door.

It is the object of the present invention to provide an escutcheon or fillet which is secured to the door by a blind screw inaccessible when the door is closed. The handle is mounted in a flexible or distortable bearing to permit a given amount of leeway to compensate for misalignment and to secure the handle stem to the escutcheon by a spring key. The fillet forms a spacer for the large handle hub and holds the hub sufficiently spaced from the outer panel so as to turn freely notwithstanding the curves of the body panel.

In the drawing:

Fig. 1 is a fragmentary horizontal section through a door showing my handle assembly in place.

Fig. 2 is a section on the line 2—2 of Fig. 1.

Fig. 3 is a similar fragmentary section showing a modified form of the invention.

Referring to the drawing, 1 designates the handle having a bearing portion 2 and a handle spindle 3. 4 designates an escutcheon which in Fig. 1 has a hook-like portion or lug 5 which can hook into a perforation 6 in the door panel. The escutcheon has a yieldable bushing 7 of the type described and claimed in the Barnes Patent No. 2,104,217, January 4, 1938. This bushing comprises a sheet metal thimble 8, a rubber sleeve 9 and a flange 10 which is expanded at the inner end of the thimble and locks the bushing in the opening through the escutcheon.

This arrangement has the advantage that the bushing can be locked into the escutcheon before the escutcheon is set into the door. This may be done by suitable machine operation which is not possible when fitting the bushing in the door panel itself. It has been found advisable, in mounting this bushing in a door, to place the rubber sleeve and the sheet metal thimble inside of the sleeve and then expand the inner end of the bushing by means of a suitable tool. This has been an entirely practical and efficient way of fastening the bushings in place, but obviously the bushing can be anchored in place more quickly if it is fastened to a separate escutcheon which can be done on a suitable machine with a suitable jig. With the removable escutcheon held in place by a screw, it is very easy to get the bushing out of the door panel as all that has to be done is unscrew the screw and the whole escutcheon can be released. The screw may be a blind screw such as at 11 in Fig. 1 where the screw is inserted in the escutcheon before the handle is assembled in the escutcheon by means of the spring key 12. When the handle is assembled in place the large ornamental hub or collar 13 of the handle completely covers the screw and prevents disengagement.

The handle is assembled in place by means of a spring key 13 which has two curved spring legs 14 adapted to straddle the annular slot 15 in the handle stem 3. The escutcheon is first mounted in place by hooking lug 5 into perforation 6, then screwing the screw 11 into place. Then the handle with the handle stem is passed through the escutcheon and spring key 13 is slipped into place with the legs engaging in the recess 5. This holds the handle from removal and also, by reason of the wavy or curved spring legs of the key, serves to give a spring stress between the inside of the outer panel and the shoulder of the handle spindle so as to hold the parts in non-rattling position. The spring key has a bent back spring catch 20 which snaps in behind the metal of the jamb and keeps the spring key from working loose.

In the construction shown in Fig. 3, the yieldable bushing 7a is combined with a spherical bearing 8a which gives a greater range for angular displacement of the handle axis. Here too the escutcheon is held in place by means of a screw, but the screw is an obliquely-directed screw turned into the escutcheon from the inside of the door overlap flange 15. The screw is designated 16. So long as the door is locked, the escutcheon cannot be removed. The side of the escutcheon opposite the screw has a slot 22 which fits into the edge of the center opening.

These escutcheons are not used for ornamentation, but are used primarily as fillers or spacers. No escutcheon is desired or needed with the rubber-floated sheet metal bushing with an ordinary handle, but more recently handles have been adopted on more expensive cars having heavy decorative enlarged hub portions. Many of the cars, especially the torpedo models, have rather short-radius body curves. Hence, with a handle having an enlarged decorative hub it would be only spaced by the bead on the end of the sheet metal bushing. Then the hub in turning would bear into some of the curved portions of the body. Hence, it is desirable and necessary to have a spacer or an escutcheon to afford a flat face or plateau for these large hub handles to turn on.

In some designs the escutcheon is a part of the belt molding of the car. Many of the handles today are set to line up with the belt molding and the handle itself, when in position of rest, blends into the belt molding. Such an escutcheon is shown at 17 in Fig. 3 where 18 designates the belt molding.

What I claim is:

A handle and escutcheon assembly for automobile door handles, having in combination an escutcheon and bearing having a central opening, means for securing the escutcheon and bearing to the door, a handle provided with a shoulder adapted to be drawn against the end of the bearing, a handle spindle attached to the handle and arranged to pass through the opening through the escutcheon and bearing and provided with an annular groove and a spring key arranged to pass partly through an opening in the jamb face of the door and provided with curved spring arms arranged to engage the inner wall of the annular recess in the spindle and engage a fixed part on the door thereby tending to straighten said curved arms and drawing the handle spindle inwardly and the said portion of the handle shoulder tightly against the end of the bearing and releasably holding the key in place, said spring key having a turned back spring latch portion adapted to lodge behind the metal of the jamb to prevent unintended disengagement of the key member.

ROY H. DEAN.